United States Patent
Miyazaki et al.

[11] Patent Number: 5,985,409
[45] Date of Patent: Nov. 16, 1999

[54] CLEANING VIDEO TAPE MAGNETIC RECORDING MEDIUM

[75] Inventors: Takahiro Miyazaki; Reiko Watanabe; Kiyomi Ito, all of Miyagi, Japan

[73] Assignee: Sony Corporation, Tokyo, Japan

[21] Appl. No.: 08/863,436

[22] Filed: May 27, 1997

[30] Foreign Application Priority Data

May 28, 1996 [JP] Japan ................................. 8-133667

[51] Int. Cl.⁶ .......................................... G11B 5/708
[52] U.S. Cl. .................. 428/141; 428/328; 428/694 SL; 428/694 BR; 428/695 BB; 428/900
[58] Field of Search ..................... 428/141, 328, 428/694 SL, 694 BR, 694 BB, 900

[56] References Cited

U.S. PATENT DOCUMENTS

| | | | |
|---|---|---|---|
| 5,196,265 | 3/1993 | Ryoke et al. | 428/332 |
| 5,591,535 | 1/1997 | Hisano et al. | 428/694 RE |
| 5,652,040 | 7/1997 | Yamada et al. | 428/141 |
| 5,700,563 | 12/1997 | Goto et al. | 428/328 |

*Primary Examiner*—Stevan A. Resan
*Attorney, Agent, or Firm*—Hill & Simpson

[57] ABSTRACT

A cleaning tape having a cleaning effect for a magnetic head and an excellent picture quality and enabling the head cleaning state to be comprehended more reliably. The cleaning tape 1 includes a non-magnetic substrate 2 on which a magnetic paint mainly composed of magnetic powders and a binder is coated to form a magnetic layer 3. The Young's modulus in the longitudinal direction is 6000 to 10000 N/mm², the residual magnetic flux density (Br) of the uppermost layer of the magnetic layer is not lower than 200 mT, the coercivity of the uppermost layer of the magnetic layer 3 is not lower than 127 kA/m and the centerline mean roughness of the surface of the magnetic layer (Ra) is 8 to 16 nm. The magnetic powders of the cleaning tape 1 are Fe—Co based alloy powders having a mean long-axis length of 0.06 to 0.20 μm and containing 6 to 30 atm % of Co, 1 to 6 atm % of Y and 10 to 15 atm % of Al based on the amount of Fe, with the centerline mean roughness (Ra) of the surface of the magnetic layer 3 being 8 to 16 nm.

4 Claims, 2 Drawing Sheets

| MAGNETIC POWDERS | σs (emu/g) | Hc (kA/m) | SPECIFIC SURFACE AREA (m²/g) |
|---|---|---|---|
| P-1 | 134.4 | 130.9 | 57.7 |
| P-2 | 134.8 | 142.1 | 58.2 |
| P-3 | 122.1 | 124.8 | 54.8 |
| P-4 | 130.2 | 150.1 | 56.5 |
| P-5 | 152.4 | 171.5 | 44.6 |
| P-6 | 108.5 | 136.5 | 58.2 |
| P-7 | 131.4 | 119.0 | 59.7 |
| P-8 | 115.1 | 117.4 | 62.5 |

| NON-MAGNEIC SUBSTRATE | YOUNG'S MODULUS IN LONGITUDINAL DIRECTION (N/mm²) | YOUNG'S MODULUS IN TRANSVERSE DIRECTION (N/mm²) | THICKNESS (μm) | MATERIAL TYPE |
|---|---|---|---|---|
| B-1 | 7400 | 4800 | 7.8 | PET |
| B-2 | 5400 | 63000 | 7.7 | PET |
| B-3 | 8100 | 4400 | 7.7 | PET |
| B-4 | 8900 | 6100 | 7.6 | PEN |
| B-5 | 4400 | 6200 | 7.8 | PET |
| B-6 | 10900 | 5600 | 7.6 | PEN |

PET : POLYETHYLEME TEREPHTALATE
PEN : POLYETHYLENE NAPHTHALATE

FIG.3

| MAGNETIC POWDERS | Co CONTENT (atm%) | Y CONTENT (atm%) | Al CONTENT (atm%) | LENGTH ALONG LONG-AXIS (μm) |
|---|---|---|---|---|
| A | 10.6 | 2.0 | 11.9 | 0.13 |
| B | 6.1 | 2.3 | 12.1 | 0.13 |
| C | 28.6 | 2.1 | 12.2 | 0.13 |
| D | 10.3 | 1.1 | 12.0 | 0.13 |
| E | 10.1 | 6.0 | 12.0 | 0.13 |
| F | 9.9 | 1.9 | 10.1 | 0.13 |
| G | 10.2 | 2.0 | 15.0 | 0.13 |
| H | 10.0 | 2.3 | 12.4 | 0.06 |
| I | 10.5 | 2.1 | 12.2 | 0.20 |
| J | 0 | 2.1 | 12.0 | 0.13 |
| K | 32.1 | 2.4 | 11.8 | 0.13 |
| L | 10.1 | 0 | 12.3 | 0.13 |
| M | 10.5 | 6.8 | 12.4 | 0.13 |
| N | 10.2 | 2.0 | 9.2 | 0.13 |
| O | 10.1 | 2.3 | 16.2 | 0.13 |
| P | 9.8 | 2.0 | 11.9 | 0.05 |
| Q | 10.2 | 1.9 | 12.5 | 0.22 |

FIG.4 of the present invention to overcome the above-mentioned problem of the conventional cleaning tape and to provide a cleaning tape simultaneously
CLEANING VIDEO TAPE MAGNETIC RECORDING MEDIUM

BACKGROUND OF THE INVENTION

FIELD OF THE INVENTION

This invention relates to a cleaning tape for cleaning a surface of a magnetic head along which slides a magnetic recording medium (medium sliding surface). More particularly, it relates to a cleaning tape having a magnetic layer and adapted for reproducing video signals recorded on the magnetic layer and for cleaning the medium sliding surface.

DESCRIPTION OF THE RELATED ART

In the field of a video tape recorder (VTR), in keeping up with the strong demand for high density recording for improving the picture quality, attempts are being made towards reducing the recording wavelength and the track width. However, as the recording wavelength and the track width are reduced, the effect on electromagnetic characteristics of foreign matter deposited on the medium sliding surface of the magnetic head becomes outstanding. Thus a cleaning tape for cleaning the medium sliding surface of the magnetic head becomes indispensable. The cleaning tape is a necessary article also in view of maintenance characteristics of a VTR set.

Recently, there is proposed a cleaning tape having the above-mentioned cleaning performance and having video signals recorded thereon, as disclosed in U.S. Pat No. 3,978,520. Specifically, the cleaning tape, having the video signals recorded thereon, has a coated type magnetic layer which is formed by coating a magnetic paint composed of magnetic powders, a binder and an organic solvent on a non-magnetic substrate. On this magnetic layer are recorded video signals as magnetic signals.

With the cleaning tape, having the video signals recorded thereon, the magnetic head is cleaned, while recorded video signals are reproduced. With the cleaning tape, having recorded thereon video signals, the recorded video signals are reproduced more accurately with progress of cleaning of the magnetic head. Thus, with the cleaning tape, having recorded thereon video signals, the state of progress of the cleaning can be checked by reproducing the video signals for visually checking the reproduced signals.

However, with the above-described conventional cleaning tape, it is difficult to produce a magnetic tape having simultaneously a reliable cleaning effect and optimum recording/reproducing characteristics for video signals such that the picture quality of the reproduced picture is not optimum. Consequently, with the conventional cleaning tape, it is difficult to check whether or not the cleaning has come to a close based on visual observation of the reproduced picture. That is, with the conventional cleaning tape, the picture is not displayed clearly even when the cleaning of the magnetic head comes to a close. Thus, with the conventional cleaning tape, the time of end of the cleaning cannot be determined accurately such that the cleaning tape is run excessively to accelerate abrasion of the magnetic head to shorten the service life of the head.

SUMMARY OF THE INVENTION

It is therefore an object of the present invention to overcome the above-mentioned problem of the conventional cleaning tape and to provide a cleaning tape simultaneously having the cleaning effect for the magnetic head and an optimum quality of the reproduced picture to permit the user to comprehend the head cleaning state more clearly.

In one aspect, the present invention provides a cleaning tape including a non-magnetic substrate on which a magnetic paint mainly composed of magnetic powders and a binder is coated to form a magnetic layer, wherein the Young's modulus in the longitudinal direction is 6000 to 10000 N/mm$_2$, the residual magnetic flux density (Br) of the uppermost layer of the magnetic layer is not lower than 200 mT, the coercivity of the uppermost layer of the magnetic layer is not lower than 127 kA/m and the centerline mean roughness of the surface of the magnetic layer (Ra) is 8 to 16 nm.

This enables a cleaning magnetic tape to be produced, which simultaneously has the magnetic head cleaning effect and a high picture quality and in which the cleaning state of the head can be comprehended more clearly.

With the present cleaning tape, the Young's modulus in the longitudinal direction is 6000 to 10000 N/mm2. If this range is exceeded, the cleaning tape cannot be contacted optimally with the magnetic head.

With the present cleaning tape, cleaning tape, the surface roughness Ra of the surface of the magnetic layer is 8 to 16 nm. If Ra of the surface of the magnetic layer is lower than 8 nm, the cleaning force of the cleaning tape is insufficient, whereas, if it exceeds 16 nm, the friction of the cleaning tape with the magnetic head is significantly increased to cause excessive abrasion of the magnetic head.

In addition, if, with the present cleaning tape, Br of the uppermost magnetic layer is not larger than 200 mT and the coercivity thereof is not larger than 127 kA/m, the picture quality is not optimum because the lower limit of Ra of the surface of them magnetic layer is set to 8 nm. In the cleaning tape of the present invention, there is no upper limit of Br such that Br of the uppermost magnetic layer of not less than 200 mT suffices. Similarly, there is no upper limit of Hc of the uppermost magnetic layer such that Hc of the uppermost magnetic layer of not less than 127 kA/M suffices.

In another aspect, the present invention provides a cleaning tape including a non-magnetic substrate on which a magnetic paint mainly composed of magnetic powders and a binder is coated to form a magnetic layer, wherein the magnetic powders are Fe—Co based alloy powders having a mean long-axis length of 0.06 to 0.20 μm and containing 6 to 30 atm % of Co, 1 to 6 atm % of Y and 10 to 15 atm % of Al based on the amount of Fe, with the centerline mean roughness of the surface of the magnetic layer (Ra) being 8 to 16 nm. This enables a cleaning magnetic tape to be produced, which simultaneously has the magnetic head cleaning effect and a high picture quality and in which the cleaning state of the head can be comprehended more clearly.

By using the alloy containing 6 to 30 atm % of Co based on the amount of Fe, it becomes possible to realize magnetic properties higher than with the alloy composed of Fe alone. If the amount of Co is less than 6 atm % or larger than 30 atm %, the magnetic properties cannot exceed those with the use of Fe alone.

In addition, with the present cleaning tape, in which Y and Al are added n amounts of 1 to 6 atm % and 10 to 15 atm %, respectively, it becomes difficult for the magnetic powders to be sintered to one another even if the reducing temperature of magnetic powders is rased, thus enabling high saturation magnetization and high coercivity to be realized simultaneously. If the amount of Y is less than 1 atm %, sintering cannot be prohibited, whereas, if Y exceeds 6 atm %, magnetic characteristics are lowered. On the other hand, if the amount of Al is less than 10 atm %, the surface state of the magnetic powders is changed, such that the paint prepared from the magnetic powders is lowered in dispersion performance, whereas, if it exceeds 15 atm %, the magnetic characteristics are deteriorated to lower the picture quality.

With the present cleaning tape, high density recording can be sufficiently coped with by setting the long-axis length of magnetic powders to 0.06 to 0.20 μm. If the long-axis length of the magnetic powders is less than 0.06 μm, the paint prepared from the magnetic powders is lowered in dispersion performance and in electromagnetic conversion characteristics. F the long-axis length of the magnetic powders exceeds 0.20 μm, the picture quality is similarly lowered.

Preferably, carboxylic acid with two or higher valency, or anhydrides thereof, with the molecular weight of not higher than 300, is added in an amount of 1 to 5 parts by weight to the magnetic powders.

Such carboxylic acid with two or higher valency, or anhydrides thereof, with the molecular weight of not higher than 300, is adsorbed to the basic point on the surface of the magnetic powders, by a carboxylic group, while another carboxylic group is directed outwards to form an acid point on the surface of the magnetic powders to increase affinity with respect to the binder. The cleaning tape thus has an optimum picture quality as a result of improved dispersion performance of the magnetic powders.

With the cleaning tape of the present invention, the cleaning effect can be improved to enable recording of high-quality picture signals by setting the surface roughness, Young's modulus and magnetic characteristics of the magnetic layer. This in turn enables the cleaning state of the magnetic head to be comprehended more reliably.

In addition, with the cleaning tape of the present invention, the cleaning effect can be improved to enable recording of high-quality picture signals by prescribing the composition of the magnetic layer and surface roughness thereof. This again enables the cleaning state of the magnetic head to be comprehended more reliably.

BRIEF DESCRIPTION OF THE DRAWINGS

FIG. 3 shows characteristics of a non-magnetic substrate employed in Examples 1 to 11 and in Comparative Examples 1 to 8.

FIG. 4 shows the composition and the length along the long axis of magnetic powders employed in Examples 12 to 29 and in Comparative Examples 9 to 18.

DESCRIPTION OF THE PREFERRED EMBODIMENTS

Figures 1, 2:
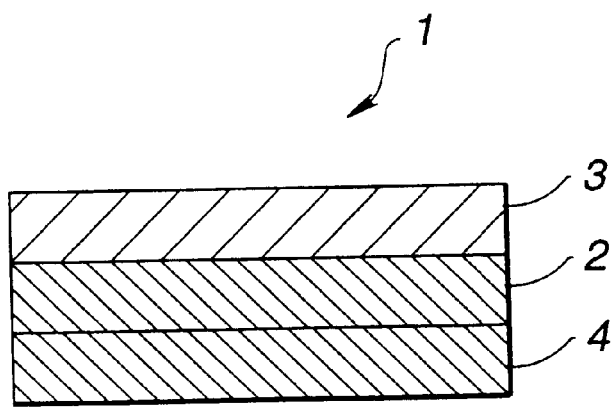
FIG. 1 is a cross-sectional view of a cleaning tape according to the present invention.
FIG. 2 shows magnetic characteristics of magnetic powders employed in Examples 1 to 11 and in Comparative Examples 1 to 8.

Referring to the drawings, preferred embodiments of the cleaning tape of the present invention will be explained in detail.

The cleaning tape embodying the present invention is used for a recording/reproducing apparatus for a magnetic recording medium such as a video tape recorder and is used for cleaning the medium sliding surface of the magnetic head. The cleaning tape 1 is made up of a non-magnetic substrate 2 and a magnetic layer 3 formed on one of the major surfaces of the non-magnetic substrate 2. If necessary, a backing layer 4 may also be formed on the opposite side major surface of the non-magnetic substrate 2.

Examples of the materials of the non-magnetic substrate 2 include polyesters, such as polyethylene terephthalate or polyethylene naphthalate, polyamides or imides, such as aramides, polyolefins, such as polypropylene or celluoses, such as cellulose triacetate.

The magnetic layer 3 is comprised of a magnetic paint formed on kneading the magnetic powders and the binder and which is applied on the above-mentioned non-magnetic substrate 2. For improving sliding performance relative to the magnetic head, the magnetic paint may be admixed with a lubricant.

For maintaining an optimum picture quality, the magnetic powders are preferably powders of ferromagnetic metals, such as iron, cobalt or nickel having as of not less than 120 Am2/kg and Hc of not less than 120 kA/m.

There is no particular limitation to the binder if the binder used is well-known as being usable for the ordinary coated type magnetic recording medium. Examples of the binder include polyurethane resins, such as polyesters, polycarbonates or polyethers, vinyl chloride based copolymers, cellulose derivatives, phenoxy resins, acrylic acid ester copolymers, vinylidene chloride based copolymers and styrene-butadiene based copolymers.

For realizing optimum dispersion characteristics, the binder preferably includes polar groups of $-SO_3M$, $-O-SO_3M$, $-NR_4X$ and $-NR_2$, where M is H, Li, Na, K or $-NR_4$, R is an alkyl group or H and X is a halogen group.

The amount of the polar groups is preferably 0.03 to 0.3 mmol per g of the binder. If the amount is smaller than 0.03 mmol per g of the binder, the effect on dispersion characteristics is poor, whereas, if it exceeds 0.3 mmol, there result poor weatherability and also poor dispersion characteristics, contrary to expectations, due to increased hygroscopicity. One of more poor groups may be contained, if so desired.

For forming a cross-linking structure among molecules of the binder, a curing agent (hardener) may also be added to the binder. An example of the curing agent is polyisocyanate. Examples of the polyisocyanates include isocyanates, such as tolylene diisocyanate, 4-4'- diphenylmethane diisocyanate, hexamethylene diisocyanate, xylene diisocyanate or isophorone diisocyanate, adducts of the above isocyanates and polyhydric alcohols, such as trimethylolpropane, and condensates of the isocyanates.

Examples of the lubricant include higher fatty acids, such as myristic acid, palmitic acid, stearic acid and oleic acid, salts thereof with metals or amines and ester compounds of the fatty acids with monohyrdric alcohols. As the ester compounds of the fatty acids, those composed of monobasic fatty acids with 10 to 24 carbon atoms, which may be branched or contain unsaturated bonds, with monohyrdric alcohols with 1 to 18 carbon atoms, which may be branched or contain unsaturated bonds, or monoalkyl ethers of alkylene oxide, may be used. Examples of the ester compounds include methyl stearate, ethyl stearate, propyl stearate, butyl stearate, sec-butyl stearate, tert-butyl stearate, isobutyl stearate, pentyl stearate, heptyl stearate, octyl stearate, butoxyethyl stearate, butyl palmitate, pentyl palmitate, heptyl palmitate, octyl palmitate, isooctyl palmitate, octyl palmitate, octyl myristate and oleyl oleate.

As the lubricant, use may also be made of ester compounds of fatty acids with alcohols with 2 to 6 hydroxy groups, silicon oils including those modified with fatty acids, or alkyl phosphoric acid esters, including those containing other substituents, such as etheric bonds, by addition of, for example, ethylene oxide, or those containing fluorine. As the lubricants, use may also be made of solid lubricants, such as perfluoro polyethers, modified products thereof, molybdenum disulfide or graphite.

These may be added at an initial or end time or in the course of mixing-dispersion of magnetic paints. These may also be formed as a top coat on the surface of the magnetic layer 3 after formation of the magnetic layer 3.

An abrasive agent may also be added to the composition of the cleaning tape 1. Examples of the abrasive agent include alumina, chromium oxide, titanium oxide, α-iron oxide, silicon carbide, corundum or artificial diamond. These may be added in a powdery state to the magnetic paint, or added at an initial or end time or in the course of mixing-dispersion of magnetic paints in the state of a slurry distinct from the magnetic powders.

As other additives for the cleaning tape composition, those having the effect of preventing electrification or light-shielding effect or friction-reducing effect, those having the effect of dispersion, cross-linking or plasticization, may be used.

The magnetic paint may be formed by kneading and mixing the above-mentioned materials using a solvent. The solvents may be enumerated by ketones, such as methylethylketone or cyclohexanone, alcohols, such as methanol or isopropyl alcohol, esters, such as ethyl acetate or butyl acetate, aromatic hydrocarbons, such as carbon tetrachloride or chloroform, or ethers, such as dioxane or diethylene glycol monoethylether.

On the opposite side of the non-magnetic substrate 2 of the cleaning tape 1 with respect to the magnetic layer 3 is formed a backing layer 4 which is provided optionally and is composed mainly of non-magnetic or magnetic powders and a binder.

The non-magnetic powders used for the backing layer 4 are mainly composed in general of carbon black. However, non-magnetic powders of calcium carbonate, alumina, titanium oxide or α-iron oxide, may also be used. As the magnetic powders used for the backing payer 4, those enumerated above for the magnetic layer 3 may be used. As the binder or other additives for the backing layer 4, those enumerated above for the magnetic layer 3 may be used. These may be used alone or in combination for the backing layer 4.

In the above-described cleaning tape 1, the magnetic tape is coated on one of the major surfaces of the non-magnetic substrate 2 and dried, after which the magnetic layer 3 is surface-processed to a surface roughness of the magnetic layer 3 in terms of the mean roughness around the centerline Ra of 8 to 16 nm. The surface processing is carried out by running a razor edge along the surface as it is set against the surface being processed.

The cleaning tape 1 is formed so that, with the Young's modulus in the longitudinal direction of 6000 to 10000 N/mm$^2$, the residual magnetic flux density Br of the uppermost magnetic layer 3 is not less than 200 mT and the coercivity of the uppermost magnetic layer 3 is 127 kA/m.

Thus the cleaning tape 1 has the cleaning effect, owing to the surface roughness of the surface of the magnetic layer 3, while exhibiting an optimum picture quality by its magnetic and physical properties.

The cleaning tape according to the present invention is not limited to the above-described structure and may be configured as in the second embodiment now explained.

Similarly to the cleaning tape 1 of the previous embodiment, the cleaning tape of the present second embodiment is made up of a non-magnetic substrate and a magnetic layer formed on one of the major surfaces of the non-magnetic substrate. In the cleaning tape of the second embodiment, a backing layer may similarly be formed on the opposite side major surface of the non-magnetic substrate. The magnetic layer is comprised of a magnetic paint, formed by kneading magnetic powders and a binder and which is coated on the non-magnetic substrate.

Since the non-magnetic substrate and the backing layer of the cleaning tape of the present second embodiment are formed of the same materials as those of the cleaning tape 1, the corresponding explanation is omitted for simplicity.

Also, with the cleaning tape of the second embodiment, the magnetic powders of the magnetic layer are Fe—Co based alloy powders with a mean long-axis length of 0.06 to 0.20 μm containing 6 to 30 atm % of Co with respect to Fe and also containing 1 to 6 atm % of Y and 10 to 15 atm % of Al with respect to Fe. The magnetic powders are of a mean long-axis length of 0.06 to 0.20 μm.

The magnetic layer may be, coated with a magnetic paint obtained on adding the binder, lubricant and the hardener similar to those used for the cleaning tape 1 of the previous embodiment. These binder, lubricant and the hardener are similar to those used for the cleaning tape 1, and hence are not explained specifically.

The cleaning tape of the above-described second embodiment has the cleaning effect, owing to the surface roughness of the surface of the magnetic layer 3, while exhibiting an optimum picture quality by its magnetic and physical properties.

EXAMPLES

Examples 1 to 11 are given below as preferred examples of the cleaning tape 1 of the first embodiment of the present invention. Also, Examples 12 to 29 are given below as preferred examples of the cleaning tape of the second embodiment of the present invention

Example 1

Of the materials shown in Table 1, 16.5 wt % of a solvent and 85 wt % of a binder are mixed together using a biaxial type continuous kneader-mixer. The magnetic powders are of magnetic properties shown by P-1 in FIG. 2.

TABLE 1

|  |  | composition (Wt %) |
|---|---|---|
| magnetic powders | magnetic powders shown in P-1 in FIG. 3 | 100 |
| binder | polyester-polyurethane, number average molecular weight, 21000; polar groups, sodium sulfonate 0.12 mmol/g; main component of polyester, isophthalic acid-ethylene glycol; isocyanate urethanate; diphenyl methane diisocyanate | 6 |
|  | vinyl chloride based copolymer; mean polymerization degree, 305; polar group, potassium sulfate 0.08 mmol; other main substituents, epoxy (0.8 mmol/g) and hydroxy group (0.3 mmol/g) | 12 |
| abrasive | alumina powders, α-ratio, 85%; mean particle size, 0.5 1 μm | 8 |

TABLE 1-continued

| | | composition (Wt %) |
|---|---|---|
| lubricant | stearic acid | 1.5 |
| | heptyl stearate | 2 |
| solvent | methylethyletone | 120 |
| | toluene | 60 |
| | cyclohexanone | 60 |

The remaining solvents and binders were then mixed by dispersion using an impeller to form a sample. After dispersion of the sample using a sand mill, 20 parts by weight of a hardener (commercial name, Coronate L, manufactured by NIPPON POLYURETHANE KK) were added. After stirring, the resulting mixture was applied on one of the major surfaces of a non-magnetic substrate of polyethylene terephthalate to a thickness of 2.5 μm. The non-magnetic substrate is as shown in B-1 in Table 3.

The resulting product was processed with magnetic field orientation processing and dried before being taken up asa roll. The resulting roll was cured (hardened) without calendering.

Then, 20 parts by weight of a hardener (commercial name, Coronate L, manufactured by NIPPON POLYURETHANE KK) were added to the paint for a backing layer having the composition shown in Table 2 and the resulting paint was coated on the opposite side major surface of the non-magnetic substrate to a thickness of 0.5 μm to form a backing layer.

TABLE 2

| | | composition (parts by weight) |
|---|---|---|
| pigments | carbon black-2 | |
| | mean particle size, 0.02 μm DBP oil absorption, 105 cc/100 g | 95 |
| | carbon black-2 | |
| | mean particle size, 0.35 μm DBP oil absorption, 40 cc/100 g | 3 |
| | titanium oxide, mean particle size of 0.4 μm | 2 |
| binders | polyester polyurethane, number average molecular weight, 2400; polar group, sodium sulfonate (0.08 mmol/g; main components of polyester, isophthalic acid, adipic acid-neopentyl glycol; ethylene glycol; urethanated isocyanate; diphenylmethane diisocyanate | 50 |
| | nitrocellulose (commercial name, Coronate manufactured by NIPPON POLYURETHANE KK) | 30 |
| hardeners | polyisocyanate (commercial name, Coronate manufactured by NIPPON POLYURETHANE KK) | 10 |

The broad-width tape, thus produced, was sliced to a width of 8 mm and a razor edge was run along its surface, with Ra set to 12.7 nm, as it was applied thereto to produce a cleaning tape of Example 1. The resulting cleaning tape was built into a cassette half to constitute a tape cassette. The tape cassette has video signals recorded therein and is used on being loaded on a recording/reproducing apparatus.

Example 2

A cleaning tape of Example 2 was prepared in the same way as in Example 1 except that the condition of applying the razor edge against the surface of the magnetic layer was changed (Ra being set to 8.3 nm). Using this Example 2, a tape cassette was formed as in Example 1.

Example 3

A cleaning tape of Example 3 was prepared in the same way as in Example 1 except that the condition of applying the razor edge against the surface of the magnetic layer was changed (Ra being set to 15.9 nm). Using this Example 3, a tape cassette was formed as in Example 1.

Examples 4 to 6

Example 4 to 6 were prepared in the same way as in Example 1 except that non-magnetic substrates having characteristics as shown in B-2, B-3 and B-4 in FIG. 3 were used for Examples 4, 5 and 6, respectively. Tape cassettes were prepared in the same way as in Example 1 using these Enamels 4 to 6.

Examples 7 to 10

Example 7 to 10 were prepared in the same way as in Example 1 except that magnetic powders having characteristics shown in P-2, P-3, P-4 and P-5 in FIG. 2 were used for the Examples 7, 8, 9 and 10, respectively. Tape cassettes were prepared in the same way as in Example 1 using these Enamels 7 to 10.

Example 11

Example 11 was prepared in the same way as in Example 1 except that a magnetic paint 1 composed mainly of cobalt-coated $Fe_2O_3$ and a binder was coated to a thickness of 1.5 μm by a so-called wet-on-wet method and subsequently the magnetic paint shown in Table 1 was coated to a thickness of 1.0 μm to form a magnetic layer. A tape cassette was prepared in the same way as in Example 1 using this Enamel 11.

Example 12

Among the materials shown in Table 3, 16.5 wt % of a solvent and 85 wt % of a binder were mixed together using a biaxial type continuous kneader/mixer. The magnetic powders are of the composition and the long-axis length as shown at A in FIG. 4.

TABLE 3

| | | composition (parts by weight) |
|---|---|---|
| magnetic powders | magnetic powders shown at A in FIG. 4 | 100 |
| Binders | polyester-polyurethane; number average molecular weight, 21000; polar groups; sodium sulfonate (0.12 mmol); main components of polyester, isophthalic acid-ethylene glycol; urethanated isocyanate; diphenylmethane diisocyanate | 6 |
| | vinyl chloride based copolymer; mean polymerization degree, 305; polar groups, potassium sulfate (0.08 mmol/g); other main substituents, epoxy (0.08 mmol/g; hydroxy group (0.3 mmol/g) | 12 |
| polyhydric carboxylic acids | citric acid | 3 |

TABLE 3-continued

| | | composition (parts by weight) |
|---|---|---|
| abrasives | alumina powders (α-ratio, 85%; mean particle size, 0.5 μm | 8 |
| lubricants | stearic acid | 1.5 |
| | heptyl stearate | 2 |
| solvents | methylethylketone | 120 |
| | toluene | 60 |
| | cyclohexanone | 60 |

The remaining solvents and binders were then mixed by dispersion using an impeller to form a sample. After dispersion of the sample using a sand mill, 20 parts by weight of a hardener (commercial name, Coronate L, manufactured by NIPPON POLYURETHANE KK) were added. After stirring, the resulting mixture was applied on one of the major surfaces of a non-magnetic substrate of polyethylene terephthalate to a thickness of 2.7 μm.

The resulting product was processed with magnetic field orientation processing and dried before being taken up as a roll. The resulting roll was cured (hardened) without calendering.

To the paint for the backing layer, having the composition shown in Table 4, 20 parts by weight of the hardener (commercial name: Coronate 1, manufactured by NIPPON POLYURETHANE KK) were added and a backing layer was formed on the opposite side major surface of the non-magnetic substrate to a thickness of 0.5 μM.

TABLE 4

| | | composition (parts by weight) |
|---|---|---|
| pigments | carbon black-1 | |
| | mean particle size, 0.02 μm; DBP oil absorption, 105 cc/100 g | 95 |
| | carbon black-2 | |
| | mean particle size, 0.35 μm; DBP oil absorption, 40 cc/100 g | 3 |
| | titanium oxide, mean particle size, 0.4 μm | 2 |
| binders | polyester-polyurethane; number average molecular weight, 24000; polar groups, sodium sulfonate (0.08 mmol); main polyester components, isophthalic acid, adipic acid-neopentyl glycol, ethylene glycol; urethanated isocyanate; diphenylmethane diisocyanate | 50 |
| | nitrocellulose (commercial name, Celnova BTH %, manufactured by ASAHI KASEI KOGYO SHA) | 30 |
| hardeners | polyisocyanate (commercial name, Coronate L manufactured by NIPPON POLYURETHANE KK) | 10 |

After the broad-width tape, thus produced, was sliced to a width of 8 mm and a razor edge was run along its surface, with Ra set to 12.7 nm, as it was applied thereto to produce a cleaning tape of Example 1. The resulting cleaning tape was built into a cassette half to constitute a tape cassette. The tape cassette has video signals recorded therein and is used on being loaded on a recording/reproducing apparatus.

Example 13

Example 13 was produced in the same way as in Example 12 except that the conditions of applying a razor edge against the surface of the magnetic layer were changed so that Ra was set to 8.4 nm. Using Example 13, a tape cassette was produced as in Example 12.

Example 14

Example 14 was produced in the same way as in Example 12 except that the conditions of applying a razor edge against the surface of the magnetic layer were changed so that Ra was set to 15.6 nm. Using Example 14, a tape cassette was produced as in Example 12.

Examples 15 to 22

Examples 15 to 22 were produced in the same way as in Example 12 except that magnetic powders having the compositions and the lengths along the long axis shown at B, C, D, E, F, G, H and I in FIG. 4 were used in Examples 15 to 22, respectively. Using these Examples 15 to 22, tape cassettes were produced as in Example 12.

Example 23

Example 23 was produced in the same way as in Example 12 except using maleic anhydride in place of polyvalent carboxylic acid used in the magnetic paint. Using Example 23, a tape cassette was produced as in Example 12.

Example 24

Example 24 was produced in the same way as in Example 12 except using nitrilo triacetic acid in place of polyvalent carboxylic acid used in the magnetic paint. Using Example 24, a tape cassette was produced as in Example 12.

Example 25

Example 25 was produced in the same way as in Example 12 except not adding polyvalent carboxylic acid to the magnetic paint. Using Example 25, a tape cassette was produced as in Example 12.

Example 26

Example 26 was produced in the same way as in Example 12 except using 0.5 parts by weight of citric acid in the magnetic paint. Using Example 26, a tape cassette was produced as in Example 12.

Example 27

Example 27 was produced in the same way as in Example 12 except using 1.0 parts by weight of citric acid in the magnetic paint. Using Example 27, a tape cassette was produced as in Example 12.

Example 28

Example 28 was produced in the same way as in Example 12 except using 5.0 parts by weight of citric acid in the magnetic paint. Using Example 28, a tape cassette was produced as in Example 12.

Example 29

Example 28 was produced in the same way as in Example 12 except using 7.0 parts by weight of citric acid in the magnetic paint. Using Example 29, a tape cassette was produced as in Example 12.

For comparison with Examples 1 to 29, produced as described above, Comparative Examples 1 to 18 were produced. Comparative Examples 1 to 8 are given for comparison with Examples 1 to 11 pertaining to the first embodiment, while Comparative Examples 9 to 18 are given for comparison with Examples 12 to 29 pertaining to the second embodiment.

Comparative Example 1

Comparative Example 1 was produced in the same way as in Example 1 except doing calendering and setting Ra to 4.1 nm. Using Comparative Example 1, a tape cassette was produced as in Example 1.

Comparative Example 2

Comparative Example 2 was produced in the same way as in Example 1 except not doing the operation of applying a razor edge against the surface of the magnetic layer and setting Ra to 21.1 nm. Using Comparative Example 2, a tape cassette was produced as in Example 1.

Comparative Example 3 and 4

Comparative Examples 3 and 4 were produced in the same way as in Example 1 except using non-magnetic substrates having characteristics as shown in B-5 and B-6 for the Comparative Examples 3 and 4, respectively. Using Comparative Examples 3 and 4, tape cassettes were produced as in Example 1.

Comparative Example 5 to 7

Comparative Examples 5 to 7 were produced in the same way as in Example 1 except using magnetic powders having characteristics as shown in P-6, P-7 and P-8 for the Comparative Examples 5, 6 and 7, respectively. Using Comparative Examples 5 to 7, tape cassettes were produced as in Example 1.

Comparative Example 8

In Comparative Example 8, a tape cassette was produced in the same way as in Example 1 except that a magnetic paint 1 composed mainly of cobalt-coated $Fe_2O_3$ and a binder was coated to a thickness of 1.5 $\mu$m by a so-called wet-on-wet method and subsequently the magnetic powders of the magnetic paint shown in Table 1 was coated to a thickness of 1.0 $\mu$m to form a magnetic layer. Using Comparative Example 8, a tape cassette was produced as in Example 1.

Comparative Example 9

Comparative Example 9 was produced in the same way as in Example 12 except doing calendering and setting Ra to 4.4 nm. Using Comparative Example 9, a tape cassette was produced as in Example 12.

Comparative Example 10

Comparative Example 10 was produced in the same way as in Example 12 except not doing the operation of applying a razor edge against the surface of the magnetic layer and setting Ra to 19.7 nm. Using Comparative Example 10, a tape cassette was produced as in Example 12.

Comparative Examples 11 to 18

Examples 11 to 18 were produced in the same way as in Example 12 except that magnetic powders having the compositions and the lengths along the long axis shown at J, K, L, M, N, O, P and Q in FIG. 4 were used in Comparative Examples 11 to 18, respectively. Using these Comparative Examples 11 to 18, tape cassettes were produced as in Example 12.

Using the Examples 1 to 29 and the Comparative Examples 1 to 18, as samples, the following tests were conducted for evaluating the performance.

Performance Evaluating Tests

Test on Picture Quality

The test on picture quality was conducted by recording color bar signals on the above sample and by checking the possible presence of white bead noise on reproducing the color bar signals. The samples completely free from the white bead noise were marked o, those occasionally suffering from the white bead noise were marked Δ and those suffering from the white bead noise at all times were marked x, respectively. Of the sample marked with o, those suffering from roughed picture quality to a lesser extent and exhibiting higher picture quality were marked ⊙.

Test on Cleaning Properties

An 8-mm video tape mainly composed of magnetic metal powders and a binder, not containing a hardener and containing a lubricant in a amount of one-fifth of the usual value was experimentally produced. This test tape was run for 30 seconds for compulsorily contaminating the magnetic head surface. It was then confirmed that, when it was attempted to reproduce a commercial 8 mm video tape having color bar signals recorded thereon, playback signals could not be produced.

The test on the cleaning performance was conducted by running a sample for 15 seconds in contact with a compulsorily polluted magnetic head and then by running a commercial 8 mm video tape having color recorded thereon in contact with the same head for checking the picture state. The samples which led to a regular picture and those which failed to lead to a picture or led to a picture suffering from noise at all times were marked o and x, respectively.

The Young's modulus of the tape was measured under an environment of a temperature of 23° C. and a humidity of 64% and under the conditions of a sample width of 8 mm, an effective length of 100 mm and a traction velocity of 100 mm/min. The value of Ra of the magnetic layer surface was measured in accordance with JISB601-1994, with the cut-off of 0.08 mm.

Test Results

The results of the above-described performance evaluating tests for the Examples 1 to 11 pertaining to the first embodiment and to the Comparative Examples 1 to 8 are shown in Tables 5 and 6, respectively.

TABLE 5

| | Young's Modulus Longitudinal Direction (N/mm$^2$) | Ra (nm) | Br (nm) | Hc (kA/m) | Cleaning Properties | Picture Quality | Head Abrasion |
|---|---|---|---|---|---|---|---|
| Ex. 1 | 7960 | 12.2 | 252 | 138.2 | o | o | o |
| Ex. 2 | 7920 | 8.3 | 242 | 138.0 | o | o | o |
| Ex. 3 | 8010 | 15.9 | 252 | 138.3 | o | o | o |
| Ex. 4 | 6460 | 131. | 247 | 137.9 | o | o | o |
| Ex. 5 | 8430 | 12.7 | 259 | 138.8 | o | o | o |
| Ex. 6 | 9080 | 11.9 | 238 | 137.6 | o | o | o |
| Ex. 7 | 7760 | 12.9 | 278 | 144.9 | o | ⊙ | o |
| Ex. 8 | 7410 | 13.8 | 208 | 127.4 | o | Δ | o |
| Ex. 9 | 7990 | 12.6 | 226 | 153.0 | o | ⊙ | o |
| Ex. 10 | 8210 | 11.3 | 329 | 175.5 | o | ⊙ | o |
| Ex. 11 | 8170 | 13.5 | *258 | *141.1 | o | o | o |

*Br and Hc are indicated as being of the uppermost magnetic layer using measured values of the samples coated as a sole layer to 10 $\mu$m.

TABLE 6

| | Young's Modulus in Longitudinal Direction (N/mm²) | Ra (nm) | Br (nm) | Hc (kA/m) | Cleaning Properties | Picture Quality | Head Abrasion |
|---|---|---|---|---|---|---|---|
| Comp. Ex. 1 | 8180 | 4.1 | 286 | 137.1 | x | ○ | ○ |
| Comp. Ex. 2 | 7890 | 21.1 | 244 | 138.3 | ○ | x | x |
| Comp. Ex. 3 | 5790 | 12.9 | 239 | 137.9 | x | ○ | ○ |
| Comp. Ex. 4 | 10420 | 13.3 | 248 | 138.4 | x | ○ | ○ |
| Comp. Ex. 5 | 8090 | 11.7 | 187 | 139.7 | ○ | x | ○ |
| Comp. Ex. 6 | 7700 | 13.3 | 224 | 121.0 | ○ | x | ○ |
| Comp. Ex. 7 | 7690 | 14.1 | 188 | 120.2 | ○ | x | ○ |
| Comp. Ex. 8 | 7750 | 14.8 | *196 | *122.1 | ○ | x | ○ |

*Br and Hc are indicated as being of the uppermost magnetic layer using measured values of the sample coated as a sole layer to 10 μm.

As for surface properties Ra of the magnetic layer, if Ra is smaller than 8 nm, the cleaning performance becomes inferior, whereas, if Ra exceeds 16 nm, abrasion to the head becomes excessive, while the picture quality is also lowered, as may be apparent from comparison of Examples 1 to 3 and the Comparative Examples 1 and 2. Therefore, if Ra is in a range from 8 to 16 nm, the cleaning performance and the picture quality are both satisfactory, while there is no problem in head abrasion.

As for the Young's modulus in the longitudinal direction of the samples, those having the Young's modulus value ranging between 6000 to 10000 N/mm² exhibit not only excellent picture quality and unobjectionable head abrasion but also excellent cleaning performance, as may be evidenced from comparison with the Examples 1, 4, 5 and 6 and Comparative Examples 3 and 4. Conversely, those samples having the values of the Young's modulus exceeding this range may be said to have only poor cleaning performance.

As for magnetic properties of the magnetic layer, those having the value of Br not less than 200 mT and Hc of 127 kA/m exhibit excellent results in tests on picture quality, cleaning characteristics and on head abrasion, as may be evidenced from comparison of Examples 1 and 7 to 11. The sample of Example 8, having the value of Br corresponding to the lowermost limit of the above range, is not of a picture quality which is perpetually subjected to noise and for which the user may be at a loss as to whether or not cleaning has been made.

In samples of Examples 7, 9 and 10, for which Hc takes on a value equal to or higher than 145 kA/m r higher, an optimum picture quality has been obtained. Conversely, those samples having magnetic properties departing this range exhibit poor picture quality.

The results of performance evaluating tests, as described above, on Examples 12 to 29 pertaining to the second embodiment, and on Comparative Examples 9 to 18, are shown in Tables 7 and 8:

TABLE 7

| | magnetic powders | surface properties Ra (nm) | polyhydric carboxylic acid (wt. parts) | cleaning performance | picture quality | head abrasion |
|---|---|---|---|---|---|---|
| Ex. 12 | A | 12.7 | 3 | ○ | ○ | ○ |
| Ex. 13 | A | 8.3 | 3 | ○ | ○ | ○ |
| Ex. 14 | A | 15.6 | 3 | ○ | ○ | ○ |
| Ex. 15 | B | 13.1 | 3 | ○ | ○ | ○ |
| Ex. 16 | C | 12.4 | 3 | ○ | ○ | ○ |
| Ex. 17 | D | 13.6 | 3 | ○ | ○ | ○ |
| Ex. 18 | E | 12.9 | 3 | ○ | ○ | ○ |
| Ex. 19 | F | 14.0 | 3 | ○ | ○ | ○ |
| Ex. 20 | G | 13.1 | 3 | ○ | ○ | ○ |
| Ex. 21 | H | 13.9 | 3 | ○ | ○ | ○ |
| Ex. 22 | I | 14.2 | 3 | ○ | ○ | ○ |
| Ex. 23 | A | 12.0 | 3 | ○ | ○ | ○ |
| Ex. 24 | A | 12.2 | 3 | ○ | ○ | ○ |
| Ex. 25 | A | 14.0 | 0 | ○ | Δ | ○ |

TABLE 8

| | magnetic powders | surface properties Ra (nm) | polyhydric carboxylic acid (wt. parts) | cleaning performance | picture quality | head abrasion |
|---|---|---|---|---|---|---|
| Ex. 26 | A | 13.6 | 0.5 | ○ | Δ | ○ |
| Ex. 27 | A | 13.4 | 1 | ○ | ○ | ○ |
| Ex. 28 | A | 12.9 | 5 | ○ | ○ | ○ |
| Ex. 29 | A | 13.8 | 7 | ○ | Δ | ○ |
| Comp. Ex. 9 | A | 4.5 | 3 | x | ○○ | |
| Comp. Ex. 10 | A | 19.1 | 3 | ○ | Δ | x |
| Comp. Ex. 11 | J | 13.8 | 3 | ○ | x | ○ |
| Comp. Ex. 12 | K | 12.6 | 3 | ○ | x | ○ |
| Comp. Ex. 13 | L | 14.1 | 3 | ○ | x | ○ |
| Comp. Ex. 14 | M | 13.1 | 3 | ○ | x | ○ |
| Comp. Ex. 15 | N | 14.6 | 3 | ○ | x | ○ |
| Comp. Ex. 16 | O | 12.9 | 3 | ○ | x | ○ |
| Comp. Ex. 17 | P | 13.4 | 3 | ○ | x | ○ |
| Comp. Ex. 18 | Q | 13.8 | 3 | ○ | x | ○ |

As for surface properties Ra of the magnetic layer, if Ra is smaller than 8 nm, the cleaning performance becomes inferior, whereas, if Ra exceeds 16 nm, abrasion to the head becomes excessive, while the picture quality is also lowered, as may be apparent from comparison of Examples 12 to 14 and the Comparative Examples 9 and 1. Therefore, if Ra is in a range from 8 to 16 nm, the cleaning performance and the picture quality are both satisfactory, while there is no problem in head abrasion.

As for magnetic powders, comparison of Examples 12 and Examples 15 to 22 to Comparative Examples 11 to 18 reveals that, if the magnetic powders used are Fe—Co-based alloy powders having the mean pong axis length of 0.06 to 0.20 μm and containing 6 to 30 atm % of Co, 1 to 6 atm % of Y and 10 to 15 atm % of Al based on the amount of Fe, excellent results may be obtained in connection with the test on picture quality, tests on cleaning performance and tests on head abrasion. Conversely, if magnetic powders used depart from the above range, the picture quality is lowered.

On the other hand, if polyhydric carboxylic acid is added to a magnetic paint, excellent results are obtained for samples of Examples 12 and 25 to 29 in connection with the tests on picture quality, cleaning characteristics and head abrasion. If polyhydric carboxylic acid is not added or only approximately 0.5 wt. parts thereof is added, the picture quality is not such that the noise is generated at all times so that the user is at a loss in giving judgment as to whether or not the tape has been cleaned, as may be evidenced in Examples 25 and 26. In particular, the samples of Examples 12, 27 and 28 with the amount of addition of the polyhydric carboxylic acid of 1 to 5 parts by weight exhibit better picture quality.

What is claimed is:

1. A cleaning video tape comprising a non-magnetic substrate on which a magnetic paint comprising magnetic powders, abrasives and a binder is coated to form a magnetic layer, said magnetic powders comprising Fe—Co based alloy powders having a mean long-axis length of 0.06 to 0.20 μm and containing from about 6 to about 30 atomic % of Co, from about 1 to about 6 atomic % of Y, and from about 10 to about 15 atomic % of Al, based on the amount of Fe, said abrasives comprising alpha alumina powders having a mean particle size of about 0.5 μm, and wherein the Young's modulus of the cleaning tape in the longitudinal direction is from about 6000 to about 10000 M/mm$^2$, the residual magnetic flux density (Br) of an uppermost layer of the magnetic layer is not lower than about 200 mT, the coercivity of the uppermost layer of the magnetic layer is not lower than about 127kA/m and the centerline mean roughness of the surface of the magnetic layer (Ra) is from about 8 to about 16 nm.

2. The cleaning video tape as claimed in claim 1 characterized in that the coercivity (Hc) of the uppermost layer of the magnetic layer is not lower than 145 kA/m.

3. The cleaning video tape as claimed in claim 1 characterized in that a backing layer is formed on the opposite side major surface of the non-magnetic substrate.

4. The cleaning video tape as claimed in claim 1, characterized in that carboxylic acid with two or higher valency or anhydrides thereof, with the molecular weight of not higher than 300, is added in an amount of 1 to 5 parts by weight to said magnetic powders.

* * * * *